(12) United States Patent
Hio et al.

(10) Patent No.: US 10,139,300 B2
(45) Date of Patent: Nov. 27, 2018

(54) HIGH PRESSURE STRAIN DETECTION DEVICE WITH A BASE MADE OF A FIRST BRITTLE MATERIAL AND A STRAIN DETECTION ELEMENT BONDED TO THE BASE VIA A SECOND BRITTLE MATERIAL

(71) Applicant: Hitachi Automotive Systems, Ltd., Hitachinaka-shi, Ibaraki (JP)

(72) Inventors: Masayuki Hio, Hitachinaka (JP); Mizuki Shibata, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 146 days.

(21) Appl. No.: 15/106,898

(22) PCT Filed: Nov. 12, 2014

(86) PCT No.: PCT/JP2014/079900
§ 371 (c)(1),
(2) Date: Jun. 21, 2016

(87) PCT Pub. No.: WO2015/098324
PCT Pub. Date: Jul. 2, 2015

(65) Prior Publication Data
US 2017/0038269 A1    Feb. 9, 2017

(30) Foreign Application Priority Data
Dec. 25, 2013   (JP) ................................ 2013-266307

(51) Int. Cl.
*G01L 9/00*   (2006.01)

(52) U.S. Cl.
CPC .......... *G01L 9/0048* (2013.01); *G01L 9/0051* (2013.01)

(58) Field of Classification Search
CPC ..... G01L 9/0002; G01L 9/0057; G01L 9/008; G01L 9/0048; G01L 9/0051;
(Continued)

(56) References Cited

U.S. PATENT DOCUMENTS 4,578,735 A * 3/1986 Knecht ................. G01L 9/0073
29/25.41
5,867,886 A * 2/1999 Ratell .................. G01L 9/0055
29/595
(Continued)

FOREIGN PATENT DOCUMENTS

JP   62-150131 A   7/1987
JP   62-291533 A   12/1987
(Continued)

OTHER PUBLICATIONS

International Search Report (PCT/ISA/210) issued in PCT Application No. PCT/JP2014/079900 dated Jan. 6, 2015 with English translation (Four (4) pages).
(Continued)

*Primary Examiner* — Harshad R Patel
*Assistant Examiner* — Nigel Plumb
(74) *Attorney, Agent, or Firm* — Crowell & Moring LLP

(57) ABSTRACT

Provided is a pressure measuring device that can stably bond a strain detection element even to a diaphragm made of metal having a large coefficient of thermal expansion. In order to achieve the above object, the pressure measuring device of the present invention includes: a metal housing including a pressure introduction unit and a diaphragm deformed by a pressure introduced via the pressure introduction unit; and a strain detection element for detecting strain generated in the diaphragm, wherein a base made of a first brittle material is provided on the metal housing, and the strain detection element is bonded to the base via a
(Continued)

second brittle material having a melting point lower than a melting point of the base.

9 Claims, 3 Drawing Sheets

(58) Field of Classification Search
CPC ......... G01L 9/0055; G01L 9/04; G01L 19/14; G01L 13/025; G01L 11/04; G01L 7/08; G01L 7/00; G01N 21/1702
See application file for complete search history.

(56) References Cited

U.S. PATENT DOCUMENTS

| | | | | |
|---|---|---|---|---|
| 5,872,315 | A * | 2/1999 | Nagase | ............... G01L 9/0052 73/726 |
| 9,739,676 | B2 * | 8/2017 | Hio | ................. G01L 9/0051 |
| 2001/0039837 | A1 * | 11/2001 | Tanizawa | ............ G01L 9/0055 73/715 |
| 2010/0186514 | A1 * | 7/2010 | Teshigahara | .......... G01L 9/0025 73/702 |
| 2015/0377729 | A1 * | 12/2015 | Hio | ..................... G01L 9/0051 73/726 |

FOREIGN PATENT DOCUMENTS

| | | | | |
|---|---|---|---|---|
| JP | 2-90508 | A | 3/1990 | |
| JP | 11-130463 | A | 5/1999 | |
| JP | 2001-272287 | A | 10/2001 | |
| JP | 2001272287 | | * 10/2001 | ............... G01B 7/16 |
| JP | 2013-36935 | A | 2/2013 | |
| JP | 2013036935 | | * 2/2013 | ............. G01L 19/04 |

OTHER PUBLICATIONS

Japanese-language Written Opinion (PCT/ISA/237) issued in PCT Application No. PCT/JP2014/079900 dated Jan. 6, 2015 (Six (6) pages).

Extended European Search Report issued in counterpart European Application No. 14873953.5 dated Mar. 17, 2017 (nine (9) pages).

* cited by examiner

HIGH PRESSURE STRAIN DETECTION DEVICE WITH A BASE MADE OF A FIRST BRITTLE MATERIAL AND A STRAIN DETECTION ELEMENT BONDED TO THE BASE VIA A SECOND BRITTLE MATERIAL

TECHNICAL FIELD

The present invention relates to a pressure measuring device attached to various measurement target apparatuses to detect pressures thereof.

BACKGROUND ART

A pressure measuring device is formed as, for example, a high-pressure sensor mounted on a vehicle and is used to measure a fuel pressure of an engine, a brake hydraulic pressure, various kinds of gas pressures, and the like.

For example, PTLs 1 and 2 propose conventional pressure measuring devices.

PTL 1 discloses "a pressure detector formed by bonding plate glass a diaphragm surface of pressure-receiving metal diaphragm visa low-melting glass layer, placing a strain gauge semiconductor chip on the plate glass, and performing anodic bonding on the plate glass and the strain gauge semiconductor chip".

PTL 2 discloses "a pressure sensor in which a sensor element is bonded to a diaphragm by a bonding member having a first bonding surface bonded to the sensor element and a second bonding surface bonded to the diaphragm formed in a metal stem, wherein the bonding member is formed so that a coefficient of thermal expansion of the first bonding surface is closer to a coefficient of thermal expansion of the sensor element than to a coefficient of thermal expansion of the metal stem, a coefficient of thermal expansion of the second bonding surface is closer to the coefficient of thermal expansion of the metal stem than to the coefficient of thermal expansion of the sensor element, and the coefficient of thermal expansion is continuously changed from the first bonding surface the second bonding surface".

CITATION LIST

Patent Literatures

PTL 1: JP-A-62-291533
PTL 2: JP-A-2013-36935

SUMMARY OF INVENTION

Technical Problem

In the conventional pressure measuring devices including the device in PTL 1, a strain detection element made of silicon is bonded to a diaphragm via low-melting glass, and, in order to prevent breakage of the strain detection element and a bonding layer due to stress generated in a cooling step in bonding, the diaphragm is made of an Fe—Ni—Co-based alloy having a coefficient of thermal expansion close to coefficients of thermal expansion of silicon and glass. However, the Fe—Ni—Co-based alloy has comparatively low proof stress and therefore is not suitably used at a high pressure and is corroded in a high temperature high environment.

Thus, it is considered that the diaphragm is made of stainless steel having high proof stress and high corrosion resistance. However, coefficients of thermal expansion of stainless steel and the strain detection element are largely different, and therefore large stress may be generated in the bonding layer in the cooling step in bonding. This may result in breakage of the strain detection element and the bonding layer.

Although PTL 2 discloses the bonding member formed by mixing a plurality of bonding materials so that a coefficient of thermal expansion thereof is continuously changed, it is difficult to control the coefficient of thermal expansion of the bonding member because, in general, the coefficient of thermal expansion thereof is abruptly changed around a melting point. Further, in the case where mixing is not sufficiently controlled, a bonding state may vary because the coefficient of thermal expansion is ununiform when mixing is ununiform. Thus, stability of bonding is problematic.

In the inventions disclosed in PTLs 1 and 2, connection reliability obtained when the strain detection element is connected on the diaphragm having a large coefficient of thermal expansion can still be improved.

The present invention has been made to solve the above problems, and an object thereof is to provide a pressure measuring device having high bonding reliability between a strain detection element and a diaphragm made of a metal material whose coefficient of thermal expansion is larger than coefficients of thermal expansion of silicon and glass.

Solution to Problem

In order to solve the problem, a pressure detection device according to the present invention, includes: a metal housing including a pressure introduction unit and a diaphragm deformed by a pressure introduced via the pressure introduction unit; and a strain detection element for detecting strain generated in the diaphragm, wherein a base made of a first brittle material is provided on the metal housing, and the strain detection element is bonded to the base via a second brittle material having a melting point lower than a melting point of the base.

Advantageous Effects of Invention

According to the present invention, it is possible to provide a pressure detection element having high bonding reliability between a strain detection element and a diaphragm made of a metal material whose coefficient of thermal expansion is larger than coefficients of thermal expansion of silicon and glass.

DESCRIPTION OF EMBODIMENTS

Figure 1:
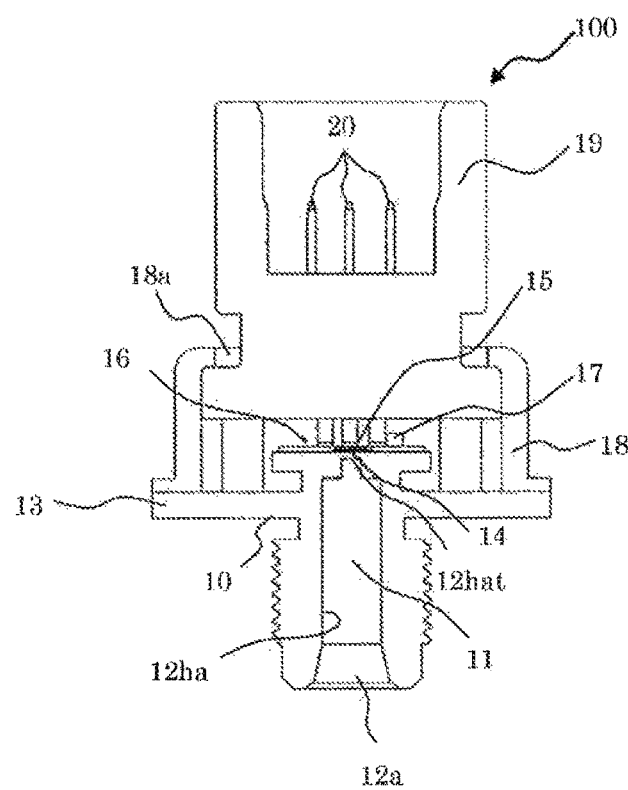
FIG. 1 is a schematic cross-sectional view of the whole pressure measuring device in Example 1 of the present invention.

Example 1 of the present invention is hereinafter described with reference to FIG. 1 to FIG. 3.

A pressure measuring device 100 in Example 1 of the present invention is hereinafter described with reference to FIG. 1.

The pressure measuring device 100 includes a metal housing 10 in which a pressure port 12, a diaphragm 14, and a flange 13 are formed, a strain detection element 15 for measuring a pressure introduced into a pressure port 11, a substrate 16 electrically connected to the strain detection element 15, a cover 18, and a connector 19 electrically connected to an external device.

The pressure port 11 includes a hollow tubular pressure introduction unit 12*ha* in which a pressure introduction port 12*a* is formed on one-end side (lower side) in an axial direction and the cylindrical flange 13 formed on the other end side (upper side) in the axial direction of the pressure introduction unit 12*ha*. The diaphragm 14 deformed by a pressure to cause strain is provided in a central portion of the flange 13.

The diaphragm 14 has a pressure-receiving surface for receiving a pressure introduced via the pressure introduction port 12*a* and a sensor mounting surface that is a surface opposite to the pressure-receiving surface.

A tip end portion 12*hat* facing the strain detection element 15 on the diaphragm 14 side in the pressure introduction unit 12*ha* of the pressure port 11 has a rectangular shape and is continuously provided to perforate the central portion of the flange 13 toward a portion having a height slightly lower than that of an upper surface of the diaphragm 14. The rectangular shape of this tip end portion 12*hat* causes a strain difference in an x direction and a –y direction in the diaphragm 14.

The strain detection element 15 is bonded to a substantially central portion of the sensor mounting surface of the diaphragm 14. The strain detection element 15 is formed on a silicon chip as a semiconductor chip including one or more strain resistance bridges 30*a* to 30*c* that output electrical signals according to deformation (strain) of the diaphragm 14.

On the substrate 16, an amplifier for amplifying each detection signal output from the strain detection element 15, an A-D converter for converting an analog output signal of the amplifier to a digital signal, a digital signal calculation processing circuit for performing correction calculation described below on the basis of the digital signal, a memory in which various kinds of data are stored, a capacitor 17, and the like are mounted.

A predetermined diameter range around the center of a blocking plate 18*a* for blocking the other end in axial direction of the cover 18 is cut out, and the connector 19 that is made of, for example, resin and is for outputting a detection pressure value detected in the pressure measuring device 100 to an external device is inserted into the cut-out portion.

One end of the connector 19 is fixed to the cover 18 in the cover 18, and the other end of the connector 19 is exposed to the outside from the cover 18.

Rod-like terminals 20 inserted by, for example, insert molding are provided inside the connector 19. Those terminals 20 are, for example, three terminals for supplying power, for grounding, and for outputting signals and are electrically connected to an ECU or the like of an automobile via wiring members by connecting one end of each terminal 20 to the substrate 16 and connecting the other end thereof to an external connector (not illustrated).

A circuit configuration of the plurality of strain resistance bridges of the strain detection element 15 and the circuit members mounted on the substrate 16 will be described with reference to FIG. 2. The strain resistance bridges 30*a* to 30*c* are formed by bridge-connecting resistance gauges whose resistance values are changed when the respective strain resistance bridges are strained in accordance with deformation of the diaphragm 14.

Output signals (bridge signals corresponding to pressure) of the strain resistance bridges 30*a* to 30*c* are amplified by amplifiers 31*a* to 31*c*, and the amplified output signals are converted into digital signals by A-D (analog-digital) converters 32*a* to 32*c*.

A digital signal calculation processing circuit 33 performs calculation processing for correcting, for example, a pressure value detected by the single strain resistance bridge 30*a* with the use of detection pressure values of the other strain resistance bridges 30*b* and 30*c* on the basis of output signals of the A-D converters 32*a* to 32*c* and outputs the corrected pressure value as a detection value of the pressure measuring device.

This digital signal calculation processing circuit 33 performs not only the correction calculation processing but also, for example, processing for comparing the detection pressure values of the plurality of strain resistance bridges or comparing the detection pressure values of the strain resistance bridges with prescribed pressure values stored in advance in a nonvolatile memory 34 to thereby determine deterioration of a measurement target apparatus and deterioration of the strain detection element 16 and output a failure signal at the time of such determination.

Figure 2:
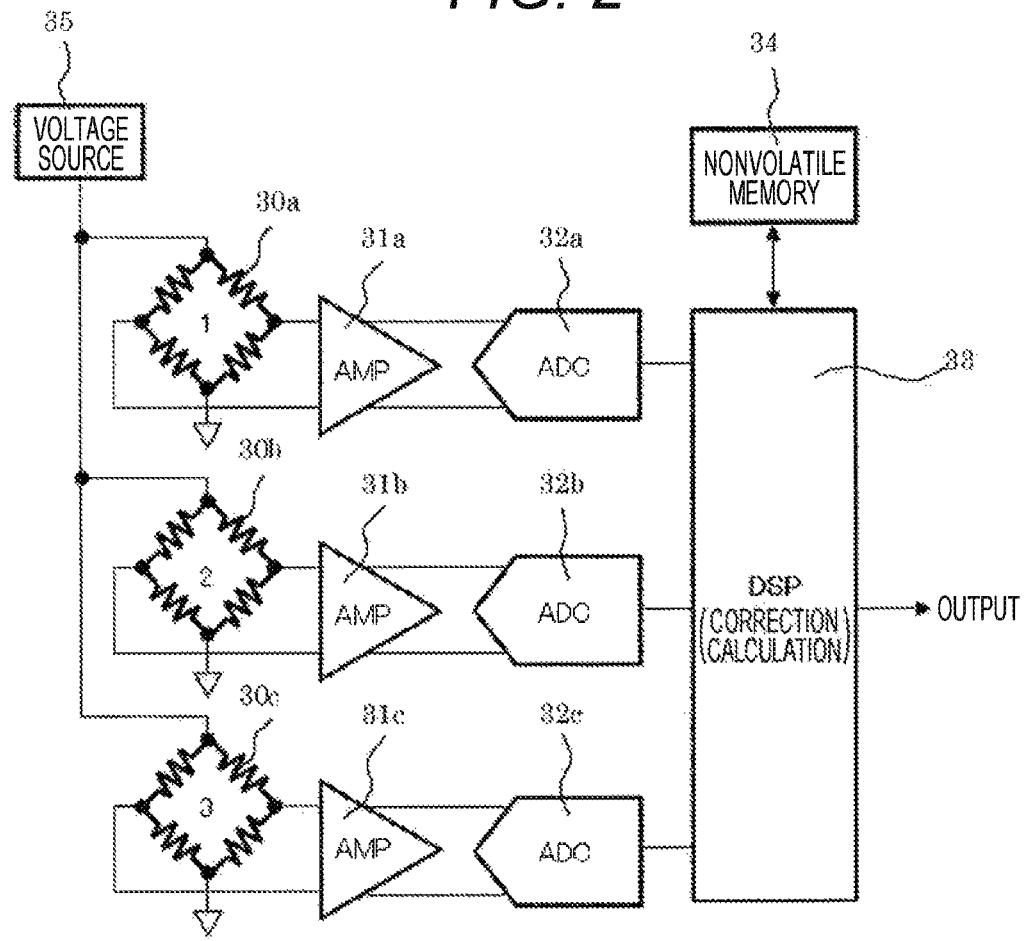
FIG. 2 is a circuit diagram of the pressure measuring device in Example 1 of the present invention.
Figure 3:
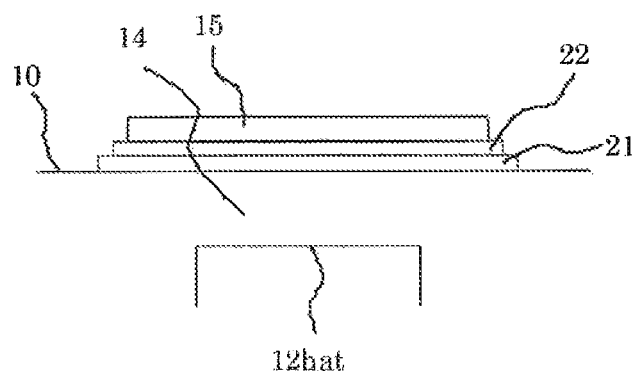
FIG. 3 is an enlarged cross-sectional view of a bonding portion in Example 1 of the present invention.

Note that supply of power to the strain resistance bridges 30*a* to 30*c* from a voltage source 35 and output of each signal from the digital signal calculation processing circuit 33 are performed via the terminals 21 illustrated in FIG. 1 and FIG. 2.

The nonvolatile memory 34 may be mounted on a circuit chip different from a chip on which the other circuit members are mounted. Further, the correction calculation may be performed by an analog circuit instead of the digital signal calculation processing circuit 33.

A bonding portion of the strain detection element 15 and the diaphragm 14 in Example 1 will be described with reference to FIG. 3.

A material of the diaphragm 14 is required to have corrosion resistance and high proof stress so as to withstand a high voltage. Therefore, a material containing chrome and having corrosion resistance is subjected to precipitation hardening so as to have high proof stress, and the resultant material is used. Specifically, SUS630 is employed.

A brittle material base 21 is formed by mounting a brittle material that is broken in an elastic region, such as glass, ceramics, or concrete, on the sensor mounting surface of the diaphragm 14. The brittle material base 21 is formed on the diaphragm 14 by applying glass paste having a melting point equal to or higher than 800° C. to the diaphragm 14 and then burning the glass paste at a temperature equal to or higher than the melting point of the glass paste. The glass paste is crystallized glass and has a coefficient of thermal expansion smaller than 11 ppm.

The strain detection element 15 is bonded to the brittle material base 21 via a low-melting brittle material 22 having a melting point lower than that of the brittle material from which the brittle material base 21 is made. As the low-melting brittle material 22, glass paste containing, as a main component, glass containing vanadium whose melting point is equal to or lower than 400° C. is employed. Because the melting point of the low-melting brittle material 22 is lower than the melting point of the brittle material base 21, a physical property of the brittle material base 21 is not changed before and after bonding. Further, in the case where a bonding temperature is equal to or lower than 400° C., it is possible to suppress deterioration of the strain detection element 15 at the time of bonding.

In Example 1 of the present invention, an object bonded to the strain detection element 15 is not the diaphragm 14 but is the brittle material base 21 in which a difference between coefficients of thermal expansion of the brittle material base 21 and the strain detection element 15 is smaller than a difference between coefficients of thermal expansion of the brittle material base 21 and the diaphragm 14. This makes it possible to reduce a difference between coefficients of thermal expansion of the strain detection element 15 and the object bonded thereto, and therefore it is possible to reduce stress generated in a cooling step in bonding. Further, because the brittle material base 21 and the strain detection element 15 are bonded by the low-melting brittle material 22, it is possible to reduce a heating temperature when the strain detection element 15 is bonded. This makes it possible to reduce internal stress generated in the strain detection element 15. In particular, when the low-melting brittle material 22 is made of a material having a melting point equal to or lower than 400° C. and the bonding temperature of the strain detection element 15 is equal to or lower than 400° C., it is possible to suppress deterioration of a terminal and wiring of the strain detection element 15. This is particularly effective. In addition, the low-melting brittle material 22 is deformed in the elastic region also in a high-temperature environment in which the pressure measuring device 100 is mounted and therefore is not plastically deformed in the high-temperature environment, unlike a ductile material. This makes it possible to suppress deterioration of detection accuracy caused by plastic deformation of the bonding portion. Thus, it is possible to provide an accurate pressure detection device according to Example 1 of the present invention.

Figure 4:
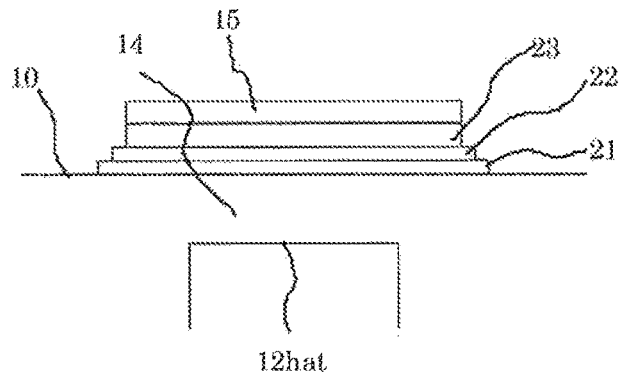
FIG. 4 is an enlarged cross-sectional view of a bonding portion in Example 2 of the present invention.

Example 2 of the present invention will be described with reference to FIG. 4. Note that, regarding a configuration similar to the configuration in Example 1, the description thereof is omitted.

In the pressure measuring device 100 in Example 2, the strain detection element 15 and a glass plate 23 are subjected to anodic bonding, and the glass plate 23 and the brittle material base 21 are bonded via the low-melting brittle material 22. When the glass plate 23 is made of a material that keeps a solid shape even at the melting point of the low-melting brittle material 22, a thickness thereof can be easily managed, as compared with the case of a paste material. Therefore, according to Example 2 of the present invention, sensitivity of the strain detection element 15 can be easily controlled to have a desired value by designing the thickness of the glass plate 23 having an inverse correlation with the sensitivity of the strain detection element 15.

Figure 5:
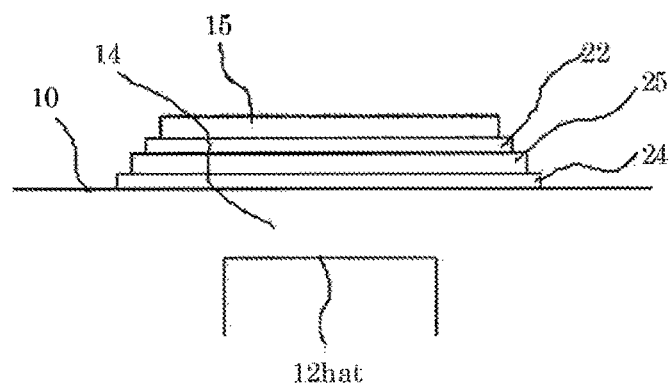
FIG. 5 is an enlarged cross-sectional view of a bonding portion in Example 3 of the present invention.

Example 3 of the present invention will be described with reference to FIG. 5. Note that, regarding a configuration similar to the configuration in Example 1, the description thereof is omitted.

In the pressure measuring device 100 in Example 3, a base 24 and a top base 25 are formed by stacking a plurality of brittle materials having melting points equal to or higher than the melting point of the low-melting brittle material 22, and at least one brittle material of the stacked brittle materials is a brittle material having a solid shape even at the melting point of the low-melting brittle material 22. Each of the stacked brittle materials has a coefficient of thermal expansion smaller than 11 ppm. As illustrated in FIG. 5, a base including two layers of brittle materials can be formed by applying glass paste having a melting point equal to or higher than that of the low-melting brittle material 22 to the diaphragm 14 as the base 24, mounting a glass plate on the base 24 as the top base 25, and burning the glass paste and the glass plate. According to Example 3 of the present invention, because solid brittle materials are used, the thickness of the bonding layer is easily managed, and the sensitivity of the strain detection element 15 can be set to have a desired value.

Example 4 of the present invention will be described with reference to FIG. 5. Note that, regarding a configuration similar to the configuration in Example 1, the description thereof is omitted.

Figure 6:
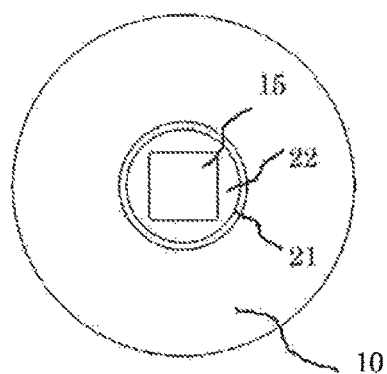
FIG. 6 is a schematic top view of a bonding portion in Example 4 of the present invention.

In Example 4, as illustrated in FIG. 6, the brittle material base 21 and the low-melting brittle material 22 are formed to have a circular shape. When the brittle material base 21 has a circular shape, it is possible to reduce stress concentration upon corner portions of the strain detection element 15. Similarly, because the low-melting brittle material 22 has a circular shape, it is possible to reduce the stress concentration upon the corner portions of the strain detection element 15. Therefore, according to Example 4 of the present invention, it is possible to suppress breakage of members caused by stress generated in the cooling step in bonding, i.e., breakage of the strain detection element 15, the brittle material base 21, and the low-melting brittle material 22.

Note that, as in the case of a circular shape, the stress concentration upon the corner portions of the strain detection element 15 generated in the cooling step in bonding can also be reduced when the brittle material base 21 has an octagonal or higher-order polygonal shape. This makes it possible to suppress breakage of members in the cooling step. Similarly, when the low-melting brittle material 22 has an octagonal or higher-order polygonal shape, it is also possible to obtain an effect similar to the effect obtained when the low-melting brittle material 22 has a circular shape.

It is also possible to obtain the similar effect by combining Example 4 with Example 2 or Example 3.

REFERENCE SIGNS LIST

10 . . . metal housing
11 . . . pressure port
12 . . . pressure introduction unit
12a . . . pressure introduction port
12ha . . . pressure introduction hole
12hat . . . tip end portion
13 . . . flange
14 . . . diaphragm
15 . . . strain detection element
16 . . . substrate
17 . . . capacitor
18 . . . cover
18a . . . blocking plate
19 . . . connector
20 . . . terminal
21 . . . brittle material base
22 . . . low-melting brittle material
23 . . . glass plate
24 . . . base
25 . . . top base
30a to 30c . . . strain resistance bridge
31a to 31c . . . amplifier
32a to 32c . . . A-D converter
33 . . . digital signal calculation processing circuit 34 . . . nonvolatile memory
35 . . . voltage source
100 . . . pressure measuring device

The invention claimed is:

1. A pressure detection device, comprising: a metal housing including a pressure introduction unit and a diaphragm deformed by a pressure introduced via the pressure introduction unit; and a strain detection element for detecting strain generated in the diaphragm, wherein a base made of a first brittle material having a first melting point is provided on the metal housing, and the strain detection element is bonded to the base via a second brittle material having a second melting point that is lower than the first melting.

2. The pressure measuring device according to claim 1, wherein a main component of the second brittle material is glass containing vanadium.

3. The pressure measuring device according to claim 1, wherein the second melting point is equal to or lower than 400° C.

4. The pressure measuring device according to claim 3, wherein the first melting point is equal to or higher than 800° C.

5. The pressure measuring device according to claim 1, wherein
the strain detection element is subjected to anodic bonding with a glass substrate, and
the glass substrate is bonded to the base via the second brittle material.

6. The pressure measuring device according to claim 1, wherein the base is formed by stacking a plurality of brittle materials having melting points equal to or higher than the second melting point, and at least one of the plurality of brittle materials has a solid shape at the second melting point.

7. The pressure measuring device according to claim 1, wherein the base and/or the second brittle material is/are formed to have a circular shape.

8. The pressure measuring device according to claim 1, wherein the base and/or the second brittle material is/are formed to have an n-gonal shape where n≥8.

9. The pressure measuring device according to claim 1, wherein the first brittle material and the second brittle materials are materials that break in an elastic region.

* * * * *